Sept. 27, 1938.     K. C. D. HICKMAN ET AL     2,131,045
SILVER RECOVERY
Filed April 9, 1937
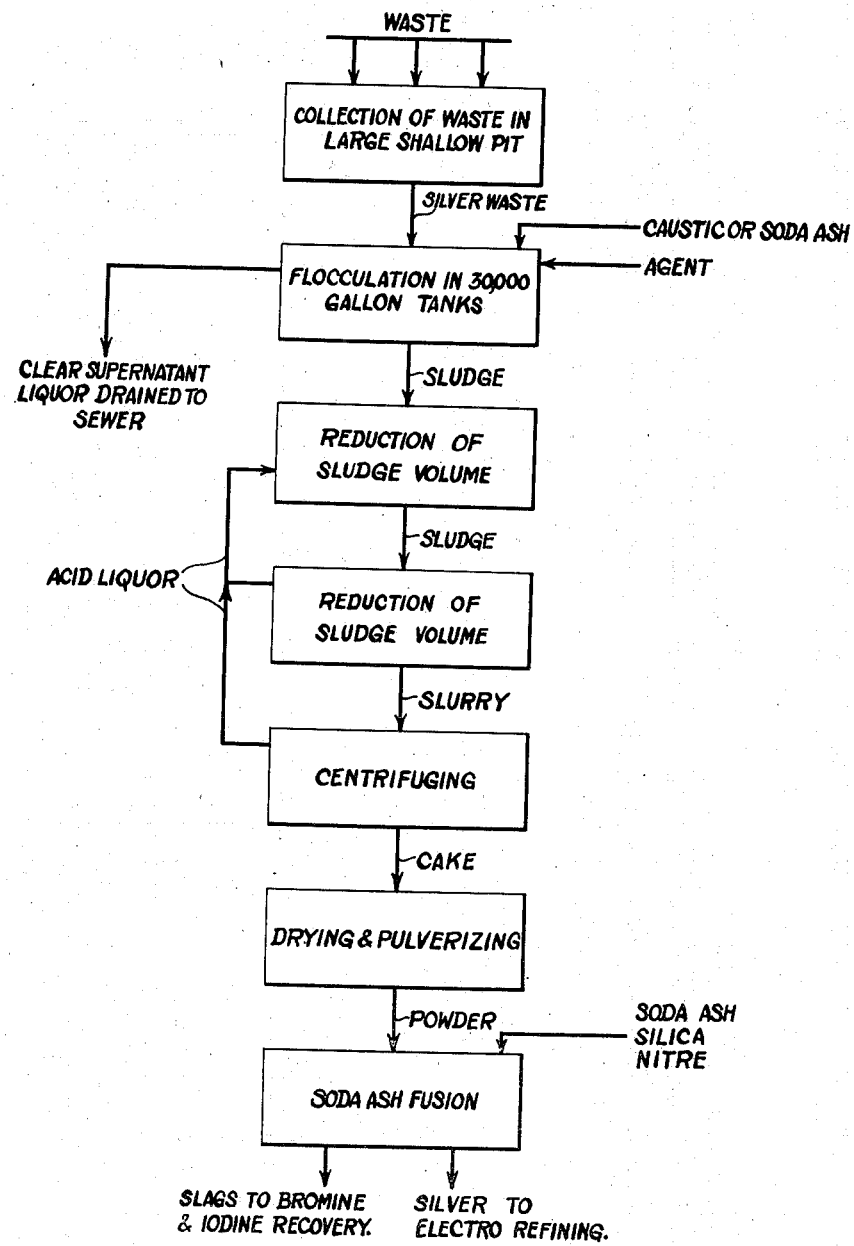
Kenneth C.D. Hickman, John R. Turner,
& Walter J. Weyerts,     INVENTORS:
BY
ATTORNEYS:

Patented Sept. 27, 1938

2,131,045

UNITED STATES PATENT OFFICE 2,131,045

SILVER RECOVERY

Kenneth C. D. Hickman, John R. Turner, and Walter J. Weyerts, Rochester, N. Y., assignors to Eastman Kodak Company, Rochester, N. Y., a corporation of New Jersey Application April 9, 1937, Serial No. 135,952

11 Claims. (Cl. 75—83)

This invention relates to processes for the production and recovery of metals from sources which contain only small or minute amounts of metals or metal-containing components, and more particularly to processes for the recovery of silver from solutions containing only small amounts of silver or silver containing components.

Various materials such as waste solutions, ores and the like contain small amounts of a precious metal such as silver. For example, there are various waste solutions containing silver produced in photographic processes such as the solutions obtained by washing scrap film and the like. These solutions contain only a very small or minute amount of precious metal; hence, standard metallurgical processes for precious metal production are unsatisfactory when applied to the treatment of solutions containing such small quantities. It is therefore apparent that the treatment of such sources of materials involves not only the technical problems of developing processes which will successfully operate on small quantities, but that there is also the problem of developing processes which are economically feasible. Certain processes, while capable of recovering metals present in minute quantities, fail in practical operation because their costs of operation are more than the value of the materials recovered. It has been proposed by certain British investigators and others to precipitate silver, but the resultant precipitate contained only a small amount of silver and a large bulk of other ingredients.

We have found a method of recovering metal from sources in which the metals or metal-containing components are present in small amounts, which process not only effectively permits the recovery of the metals but is relatively simple and economic in operation.

This invention has as one object to provide a process for producing or recovering metals from various sources of materials containing only small or minute quantities of the metal. Another object is to provide a process for treating solutions containing small amounts of metals in which the containing metal recovery is substantially complete. A still further object is to provide a process of recovering metals present only in small amounts which is simple and economic in operation. A still further object is to provide a process for the recovery of small amounts of metals in which there are no material losses of the agent employed. Still another object is to provide a process particularly adapted for recovering silver present in liquids obtained from photographic processes. Another object is to provide a process for the recovery of silver contained in wash solutions produced in photographic processes. A still further object is to provide a process for the recovery of valuable components contained in scrap film and other waste obtained in the production of photographic materials. Another object is to provide a recovery process in which the agents employed may be produced or regenerated. Still another object is to provide a silver recovery process which is simple and economic. A still further object is to provide a process for the recovery of silver from waste photographic materials in which the silver produced is of high-grade quality. Still other objects will appear hereinafter.

These objects are accomplished by our invention which includes the steps of adjusting the composition of the waste metal-containing materials, depositing the desired metal as a sludge, reducing the sludge volume without material loss of metal, and recovery of the desired metal.

For a more complete understanding of our invention, reference is made to the attached drawing, forming a part of the present application. This drawing is in the nature of a flow sheet graphically illustrating the series of steps employed in carrying out one embodiment of our invention. Reference to the attached drawing may be had in a consideration of the following example which is set forth to illustrate the preferred embodiment of our process. It is to be understood that the values to be set forth in this example are primarily for the purposes of illustrating our preferred embodiment and are not to be construed as limiting our invention.

Solutions from which silver was to be recovered were collected in a large pit or container. These solutions were obtained from waste water obtained in photographic processing, washing film scrap and various other sources. The solution contained about 11 troy ounces of silver per thousand gallons of liquid. In addition, there were various other components such as gelatin, bromides, iodides and the like. This waste silver liquid was treated with alkali such as soda ash, in order to bring the pH value somewhere in the range 6.4 to 7.8 and preferably of about 6.9 to about 7.2. If desired, calcium chloride and the like may be added to the solution for converting silver to silver halides.

After the waste solutions have been brought to the correct pH and otherwise improved, depositing agent, preferably a metallic sulphate is added thereto in order to produce a floc which carries down a sludge containing the silver component of the solution. This may be allowed to settle for a period of time and the clear supernatant liquid above the silver sludge may be discharged to the sewer. The silver sludge is generally comprised of agent, gelatin and other materials initially contained in the waste solution. The sludge volume is so large and the silver content so small, at this point, it may not be the equivalent of a low grade ore.

We have found that if the newly deposited silver containing sludge is treated with various acids, not only is the sludge volume materially reduced but in some instances solutions which may have uses are produced as a by-product. We prefer to employ about 5 cc. of 96% sulphuric acid per gallon of sludge. However, varying amounts from 1% or 2% up to 15% or 20% of the 96% sulphuric or equivalent sulphuric, if of a different concentration than 96%, may be utilized depending on the sludge volume and other such factors.

This acid treatment may be carried out in one or more steps; preferably two or three steps is to be preferred, such as for example, in accordance with the attached flow sheet. We have found that the newly deposited sludge may be easily treated. By newly deposited or precipitated, we refer to a sludge, which is from a few hours to a few days old, as contrasted to sludge that has been permitted to remain untreated for 3-4 days or more. If acids such as nitric and hydrochloric are employed, even older sludge may be treated.

The fraction resulting from the acid treatment and comprising sludge which has had its volume reduced contains a materially high percentage of silver. This material may be separated from slurry by centrifuging, settling or other similar treatment and the cake thus obtained, dried, pulverized and otherwise prepared for reduction to silver by fusion. The pulverized cake is then fed into any conventional fusion apparatus such as crucibles, electric or gas fired furnaces or other similar equipment employed in metallurgical processes. To these silver materials there is added a small amount of silica in order to flux any flocculating or precipitating agents which may have been carried through with the silver, a small amount of sodium nitrate to prevent sulphiding of the silver, and a substantial amount of soda ash. The fusion step is then carried out in a manner similar to procedure known in metallurgy and a high-grade silver metal is obtained therefrom.

This molten silver may be cast into anodes and further refined electrolytically or the silver may be otherwise employed or processed. The slags of the type above mentioned may take up valuable components such as bromine and iodine. These elements may also be recovered in any desired way from the slags.

From a consideration of the preceding example, it may be seen that we have provided a simple, efficient, and economic process for the recovery of precious metals such as silver from sources which contain the metal in small quantities. By means of our acid treatment we are able to reduce the sludge volume to a utilizable quantity for the removal of metal therefrom. This is particularly important inasmuch as the process initially involves the treatment of materials containing only very small amounts of recoverable metal. By our novel procedure we have succeeded in obtaining the precious metal under recovery, in a condition where economical fusion steps may be applied thereto. In addition, we have provided for the use of chemical materials which are relatively cheap and readily available on the market.

Our process is susceptible of some modification. While we prefer to use sulphate agents such as aluminum sulphate, copper sulphate or the like, such agents may be supplemented, supplanted or otherwise modified by other depositing or flocculating agents. Some such agents are the hydroxides and ferric chloride. The sludge volume may be altered by the use of other agents such as by hydrochloric or nitric acid, or various mixtures, for example. The precipitation of sludge is preferably carried out on several supplies of waste solution before the sludge is transferred to treatment for reducing sludge volume. The sludge volume reduction may be carried out with heating, if desired. Centrifuging, drying or pulverizing may be more or less employed or steps accomplishing a similar result substituted. Therefore, we do not wish to be restricted in our invention excepting insofar as is necessitated by the prior art and the appended claims.

What we claim and desire to secure by Letters Patent of the United States is:

1. The process of recovering precious metal from materials containing the metal in small quantities, which comprises obtaining solutions containing small quantities of precious metals, treating said solutions with sulphate agent which causes the deposition of a sludge containing the metals, subjecting the sludge to treatment with sulphuric acid, whereby the sludge volume is reduced, and treating the sludge to recover metal therefrom.

2. A process for the recovery of precious metals from solutions containing only small amounts of the metals, which comprises adjusting the pH of said solutions to between 6.4-7.8, adding flocculating agent to the solution whereby metal-containing sludge is produced, treating the metal-containing sludge with sulphuric acid for reduction of sludge volume, and recovering precious metal from the sludge fraction remaining.

3. A process for the recovery of silver from waste photographic solutions, which comprises subjecting the solutions to treatment with agent which produces a sludge containing silver, subjecting the sludge to treatment with sulphuric acid, whereby the sludge volume is reduced, and recovering silver from the sludge fraction remaining from the sulphuric acid treatment.

4. A process for the recovery of silver from materials containing only a small amount thereof, which comprises obtaining a solution containing only a small amount of metals, subjecting the solution to a precipitating treatment with an agent, whereby a sludge deposit containing silver is obtained, subjecting the newly deposited sludge to treatment with acid, whereby the sludge volume is reduced, and further treating the sludge fraction remaining to recover silver therefrom.

5. A process for the recovery of silver from wash solutions obtained in photographic processes, which comprises adjusting the pH value of said solutions to between about 6.9 to 7.2, depositing silver containing materials from the solutions by means of an aluminum floc agent, subjecting the newly deposited materials to an acid treatment whereby the sludge volume is reduced, and subjecting materials remaining from the acid treatment to fusion for recovery of silver therefrom.

6. A process for the recovery of silver from wash solutions obtained in photographic processes, which comprises adjusting the pH value of said solutions, depositing silver from the solutions by means of a floc precipitant whereby a silver-containing sludge is produced, subjecting the sludge to an acid treatment whereby the sludge volume is reduced, and subjecting the sludge fraction remaining to fusion in the presence of a soda ash, silica, and nitre slag for the recovery of silver.

7. A process for the recovery of silver from solutions containing only a small quantity thereof, which comprises subjecting said solutions to treatment with an agent which causes the deposition of a silver-containing sludge, subjecting the sludge to treatment for reducing the volume thereof, treating the sludge remaining to separate acid slurry, caking and drying the sludge, and subjecting the sludge to treatment for recovering silver therefrom.

8. A process for the recovery of silver from solutions containing only small amounts of the metal, which comprises adjusting the pH of said solutions to between about 6.9–7.2, adding a sulphate to the solution which produces a metal-containing sludge, treating the metal sludge with sulphuric acid to reduce the sludge volume, and recovering silver from the sludge fraction remaining from the acid treatment.

9. A process for the recovery of silver from waste photographic solutions, which comprises subjecting solutions to treatment with sulphate agent which produces a sludge containing silver, subjecting the sludge to treatment with sulphuric acid, whereby the sludge volume is reduced, recovering silver from the sludge fraction remaining from the sulphuric acid treatment, and subjecting the recovered silver to electrolysis.

10. A process for the recovery of silver from wash solutions obtained in photographic processes, which comprises adjusting the pH value of said solutions to between about 6.9–7.2 by the addition of an alkali thereto, depositing silver from the solutions by means of an aluminum floc agent whereby a silver-containing sludge is produced, subjecting the sludge within 36 hours of deposition to an acid treatment to reduce the sludge volume, and subjecting the sludge fraction remaining therefrom to fusion in the presence of a soda ash slag for the recovery of silver therefrom.

11. A process for the recovery of silver from solutions containing only a small quantity thereof, which comprises subjecting said solutions to treatment with an agent which causes the deposition of a silver-containing sludge, subjecting the sludge within about 24 hours after deposition to acid treatment for reducing the volume thereof, treating the sludge remaining to separate acid slurry, caking and drying the sludge, subjecting the sludge to a fusion reduction treatment to produce bar silver, and subjecting the bar silver to electrolysis.

KENNETH C. D. HICKMAN.
JOHN R. TURNER.
WALTER J. WEYERTS.